United States Patent
Butzmann

(10) Patent No.: US 8,810,070 B2
(45) Date of Patent: Aug. 19, 2014

(54) SERIES CONNECTION OF ON-OFF CONTROLLERS FOR POWER TRANSMISSION IN BATTERY SYSTEMS

(75) Inventor: Stefan Butzmann, Beilstein (DE)

(73) Assignee: Robert Bosch GmbH, Stuttgart, DE (US)

(*) Notice: Subject to any disclaimer, the term of this patent is extended or adjusted under 35 U.S.C. 154(b) by 497 days.

(21) Appl. No.: 13/145,443

(22) PCT Filed: Jan. 14, 2010

(86) PCT No.: PCT/EP2010/050376
§ 371 (c)(1),
(2), (4) Date: Jul. 20, 2011

(87) PCT Pub. No.: WO2010/084069
PCT Pub. Date: Jul. 29, 2010

(65) Prior Publication Data
US 2011/0273024 A1    Nov. 10, 2011

(30) Foreign Application Priority Data
Jan. 20, 2009  (DE) .......... 10 2009 000 323

(51) Int. Cl.
*H02J 1/00*  (2006.01)
(52) U.S. Cl.
USPC .......................................................... 307/83
(58) Field of Classification Search
USPC .......................................................... 307/83
See application file for complete search history.

(56) References Cited

U.S. PATENT DOCUMENTS

| | | | | |
|---|---|---|---|---|
| 4,253,137 | A * | 2/1981 | Rao | 363/21.1 |
| 6,208,039 | B1 * | 3/2001 | Mendelsohn et al. | 307/52 |
| 6,232,749 | B1 | 5/2001 | Hewes et al. | |
| 6,385,056 | B1 * | 5/2002 | Gucyski | 363/15 |
| 2006/0206901 | A1 | 9/2006 | Chan | |
| 2007/0139012 | A1 | 6/2007 | Hayashigawa | |
| 2007/0156939 | A1 | 7/2007 | Farchi et al. | |
| 2007/0236173 | A1 | 10/2007 | Kimura | |
| 2008/0042493 | A1 * | 2/2008 | Jacobs | 307/82 |
| 2010/0213898 | A1 | 8/2010 | Hayashigawa | |

FOREIGN PATENT DOCUMENTS

| | | |
|---|---|---|
| CN | 101064438 A | 10/2007 |
| JP | 6-90567 A | 3/1994 |
| JP | 10063629 A | 3/1998 |
| JP | 2002-281751 A | 9/2002 |
| JP | 2002-359975 A | 12/2002 |
| JP | 4828106 B2 | 4/2006 |
| JP | 2007-280187 A | 10/2007 |
| JP | 2006-092834 B2 | 11/2011 |

* cited by examiner

Primary Examiner — Robert L. Deberadinis
(74) Attorney, Agent, or Firm — Maginot, Moore & Beck

(57) ABSTRACT

A power transmitter for a battery system, a battery system including such a power transmitter, and a motor vehicle including such a battery system are disclosed. The power transmitter includes a plurality of DC/DC converters, each of which has a first and a second input and a first and a second output. According to the invention, first and second inputs are designed to connect a battery module, while the DC/DC converters are connected in series at the output end.

16 Claims, 4 Drawing Sheets

SERIES CONNECTION OF ON-OFF CONTROLLERS FOR POWER TRANSMISSION IN BATTERY SYSTEMS

CROSS-REFERENCE TO RELATED APPLICATION

This application is a 35 USC 371 application of PCT/EP 2010/050376 filed on Jan. 14, 2010.

BACKGROUND OF THE INVENTION

1. Field of the Invention

The invention relates to a power transmitter for a battery system, a battery system having such a power transmitter, and a motor vehicle having such a battery system.

2. Description of the Prior Art

There is a growing need for battery systems that are to be used in stationary applications, such as wind farms and emergency current systems, but also in vehicles. All of these requirements make stringent demands in terms of reliability and fail-safety. The reason for this is that a complete failure of the voltage supply by the battery system can cause a failure of the entire system. In wind farms, for instance, batteries are used for adjusting the rotor blades in strong winds and protecting the system in this way against excessive mechanical stresses that can damage or even destroy the wind farm. In the case of battery failure in an electric car, the car could not be driven. An emergency current system, in turn, should specifically ensure uninterrupted operation, for instance of a hospital, and therefore must itself as much as possible be incapable of failing.

To make it possible to furnish the requisite power and energy for the particular application, individual battery cells are connected in series and sometimes additionally in parallel. FIG. 1 shows a basic circuit diagram for a series circuit of batteries. Many battery cells 10-1 through 10-*n* are connected in series, in order to achieve the requisite high operating voltage, for instance in a passenger car for the electric motor, by adding together the voltage of the individual cells 10-1, . . . , 10-*n*. The high operating voltage can be decoupled by switches 11-1 and 11-2 on the output side from the following power electronics elements, not shown, such as inverters. Since the entire output current of the battery, because of the series connection of the battery cells 10-1, . . . , 10-*n*, flows in each of the battery cells 10-1, . . . , 10-*n*, and the charge transport takes place by means of electrochemical processes inside the battery cells 10-1, . . . , 10-*n*, the failure of a single battery cell in an extreme case means that the entire arrangement can no longer furnish any current and hence no electrical energy. To enable detecting a threatening failure of one battery cell 10-1, . . . , 10-*n* in good time, conventionally a so-called battery management system 12 is employed, which is connected or connectable to both poles of each of the battery cells 10-1, . . . , 10-*n* and which at regular or selectable intervals determines operating parameters, such as voltage and temperature, of each battery cell 10-1, . . . , 10-*n* and from that the state of charge (SoC) of each of them. This entails major expense and at the same time makes for poor flexibility of the electrical operating data of the battery system.

Further disadvantages of the series connection of many battery cells are as follows:

1. For different operating states of the apparatus to be operated with the battery, conditions for the operating voltage to be furnished, the maximum current, and the stored energy, are made that can be combined only if a greater number of battery cells is coupled together than would actually be necessary to meet the requirements. This increases the price and, particularly in an electric car, it also increases the problematic weight and volume of the battery system.

2. Installing the battery, or in other words connecting the individual cells together, is done because of the voltages, added together by the series connection, of the individual battery cells, which at high voltages are up to 1000 V; therefore, replacement of the battery or individual cells or modules cannot be done in local facilities, or in the case of a stationary application, it can be done only by especially trained professionals using special tools. As a result, the logistical effort and expense for the maintenance of battery systems in the event of a malfunction is high.

3. To switch the battery system without voltage, or in other words to disconnect the actual battery from the load, power switches 11-1 and 11-2 must be provided, which are typically embodied as contactors and are very expensive, given the high currents and voltages to be expected.

OBJECT AND SUMMARY OF THE INVENTION

The object of the invention is to introduce a device which is capable of overcoming the aforementioned disadvantages of the prior art.

A first aspect of the invention relates to an energy transmitter for a battery system, which includes a plurality of DC/DC converters, each with one first and one second input and one first and one second output. The first and second inputs of the DC/DC converters are embodied for the connection of a battery module. The DC/DC converters are connected in series on the output side.

The invention has the advantage that on the primary side, many battery modules can be connected parallel, which each have a significantly lower clamp voltage than a series circuit of the battery modules. Therefore no voltage that would necessitate special skill with the battery on the replacement of individual battery modules or battery cells occurs at any terminal on the primary side—that is, neither at the first nor at the second inputs of the DC/DC converters. Because the outputs of the DC/DC converters are connected in series, however, on the output side there is a desired high total voltage, as a sum of the output voltages generated by the individual DC/DC converters. The device furthermore makes it possible to select a total voltage that is suitable for the operating situation, since the output voltage of the individual DC/DC converters can be adjusted in a known fashion. Moreover, the output voltage becomes independent of the number of battery cells connected on the primary side. As a result, the design of the battery system can be done purely in accordance with energy and power criteria, regardless of the total voltage required for the particular application. A further advantage is that the expensive contactors 11-1 and 11-2 can be dispensed with, since the high voltage at the battery output can be switched off in a simple manner by switching off the DC/DC converters.

Preferably, the DC/DC converters have a first coil. Especially preferably, the DC/DC converters have a second coil, which is coupled to the first coil of the DC/DC converter to make a power transmitter or storage transformer. This variant embodiment of DC/DC converters makes a galvanic decoupling of the outputs of the DC/DC converter from its inputs possible, so that a series connection of the outputs of the DC/DC converters is easily possible.

The DC/DC converters can be embodied as flyback converters, but other configurations are possible variants, such as forward converters, push-pull converters, half-bridge converters and full-bridge converters, as well as resonance converter principles.

In one version of the energy transmitter of the invention, the first inputs of the DC/DC converters are connected to a ground.

A variant embodiment in which the first and second outputs of each DC/DC converter are connected to a freewheel diode connected in the blocking direction is especially preferred. If one DC/DC converter in operation fails, for instance because one battery cell of the battery module connected on the input side is defective, the freewheel diode causes the first and second outputs of the failed DC/DC converter to be connected conductively to one another, so that in the overall arrangement, an output current can continue to flow. This variant therefore permits besides the further operation despite the failure of one or more battery cells. Moreover, the replacement of a battery module in ongoing operation is optionally possible, without interrupting the generation of the total voltage.

Alternatively, each of the DC/DC converters has a first control input for a first control signal and is embodied for electrically connecting the first output of the DC/DC converter to the second output of the DC/DC converter upon the reception of the first control signal.

In a continuation of the last two variant embodiments mentioned, each of the DC/DC converters has a second control input for a second control signal and is embodied for increasing a voltage between the first and second outputs of the DC/DC converter upon the reception of the second control signal. As a result, it becomes possible to counteract a reduction in the total voltage resulting from the aforementioned failure or the shutoff of an individual DC/DC converter, so that an at least approximately unchanged total voltage continues to be furnished by the reduced number of DC/DC converters.

A second aspect of the invention introduces a battery system having an energy transmitter in accordance with the first aspect of the invention and having a plurality of battery modules. Each of the battery modules has at least one battery cell. The battery poles of the battery modules are disconnectably connected to the corresponding input of the first and second inputs of a DC/DC converter of the energy transmitter.

A third aspect of the invention relates to a motor vehicle having a battery system in accordance with the second aspect of the invention.

BRIEF DESCRIPTION OF THE DRAWINGS

The invention will be described in further detail below in conjunction with drawings of exemplary embodiments. In the drawings.

DESCRIPTION OF THE PREFERRED EMBODIMENTS

Figure 1:
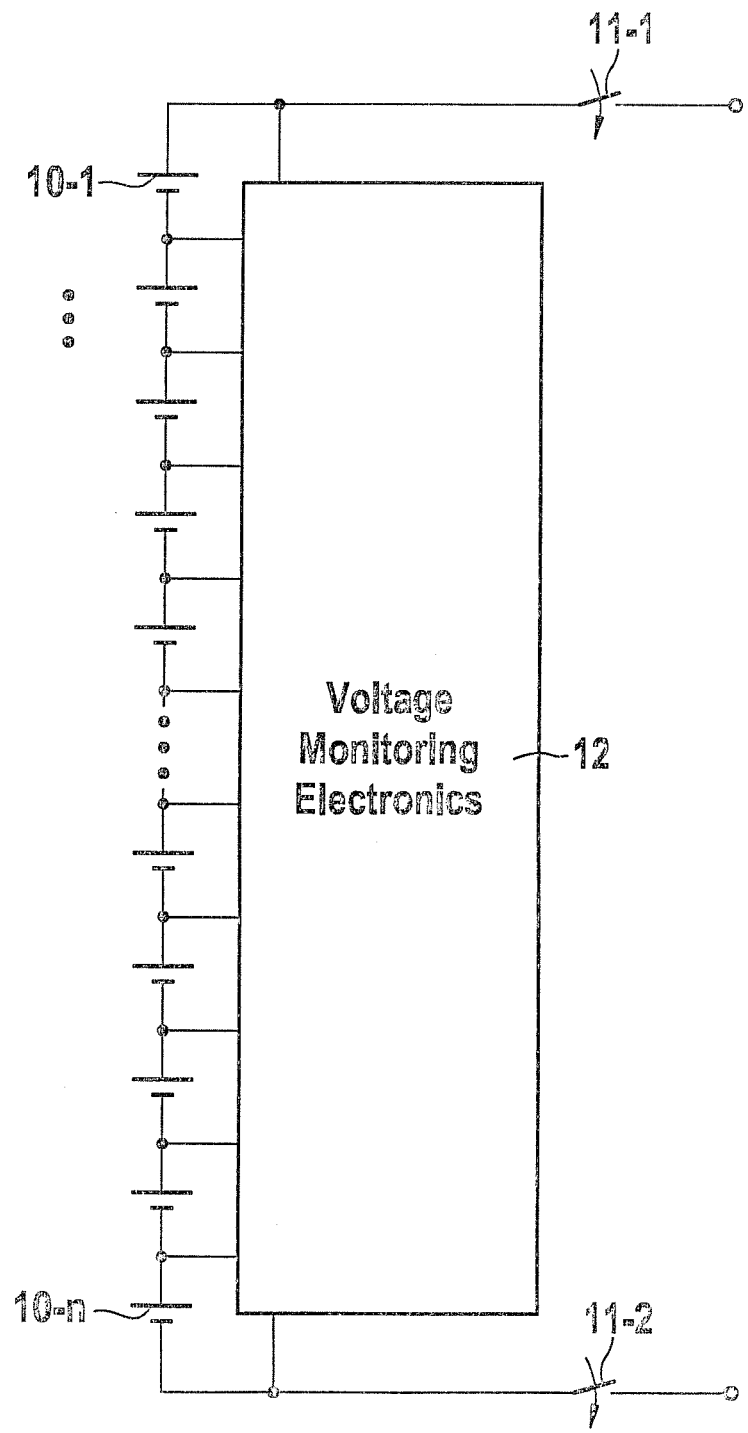
FIG. 1 shows a battery with a battery management system in accordance with the prior art.
Figure 2:
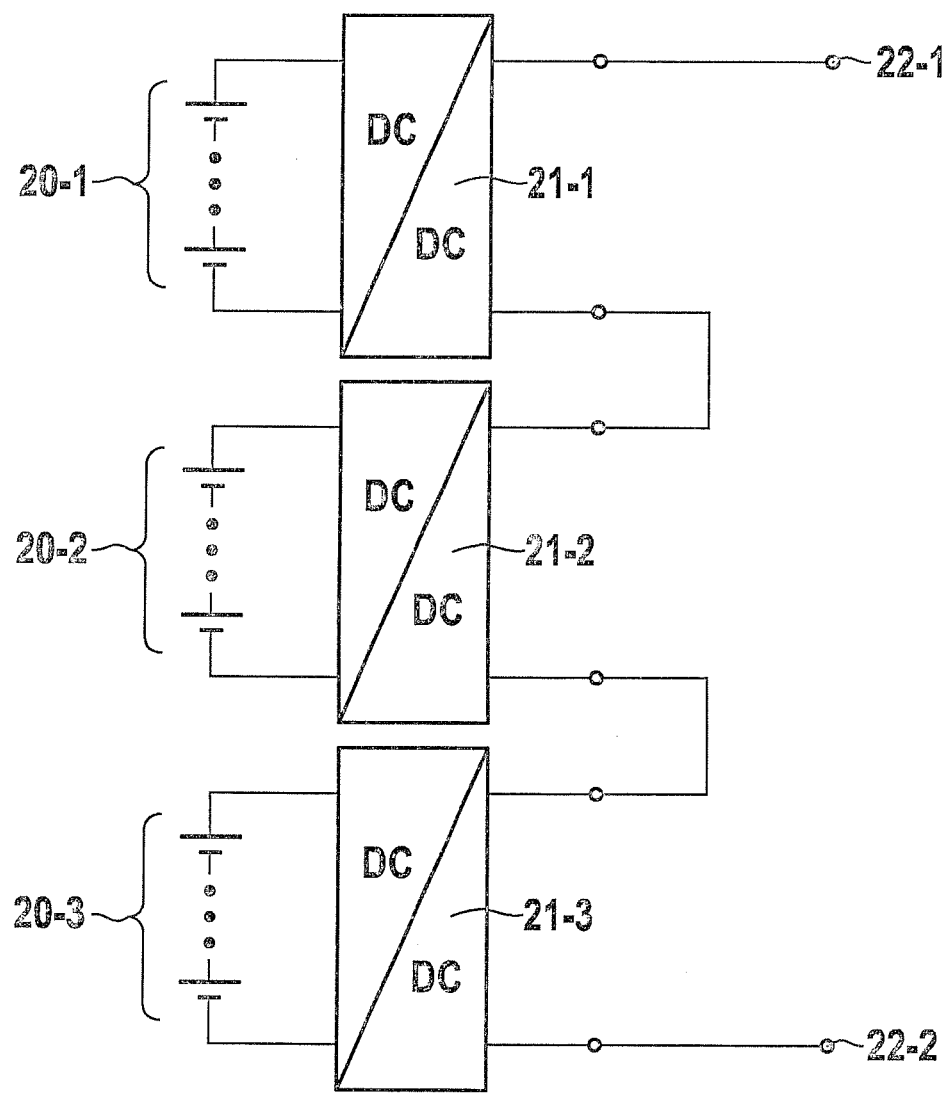
FIG. 2 shows a first exemplary embodiment of the invention.

FIG. 2 shows a first exemplary embodiment of the invention. In the example, three DC/DC converters 21-1, 21-2, 21-3 can be seen; however, in actual applications the number can be markedly higher. Each of the DC/DC converters 21-1, 21-2, 21-3 is connected on the input side to a battery module 20-1, 20-2, 20-3; in this example the battery modules each have a plurality of series-connected battery cells. As can be seen in FIG. 2, according to the invention the outputs of the DC/DC converters 21-1, 21-2, 21-3 are connected in series, so that the total voltage between the outputs 22-1 and 22-2 of the arrangement results as the sum of the individual voltages generated by the DC/DC converters 21-1, 21-2, 21-3. The DC/DC converters 21-1, 21-2, 21-3 are constructed in a known manner and make it possible to adjust the output voltage applied to the first and second outputs of each DC/DC converter 21-1, 21-2, 21-3, or also to shut off the DC/DC converters 21-1, 21-2, 21-3, so that DC/DC conversion no longer occurs. As a result, the total voltage at the outputs 22-1 and 22-2 can be adapted flexibly to the particular operating situation, which represents one of the advantages of the invention.

Figure 3:
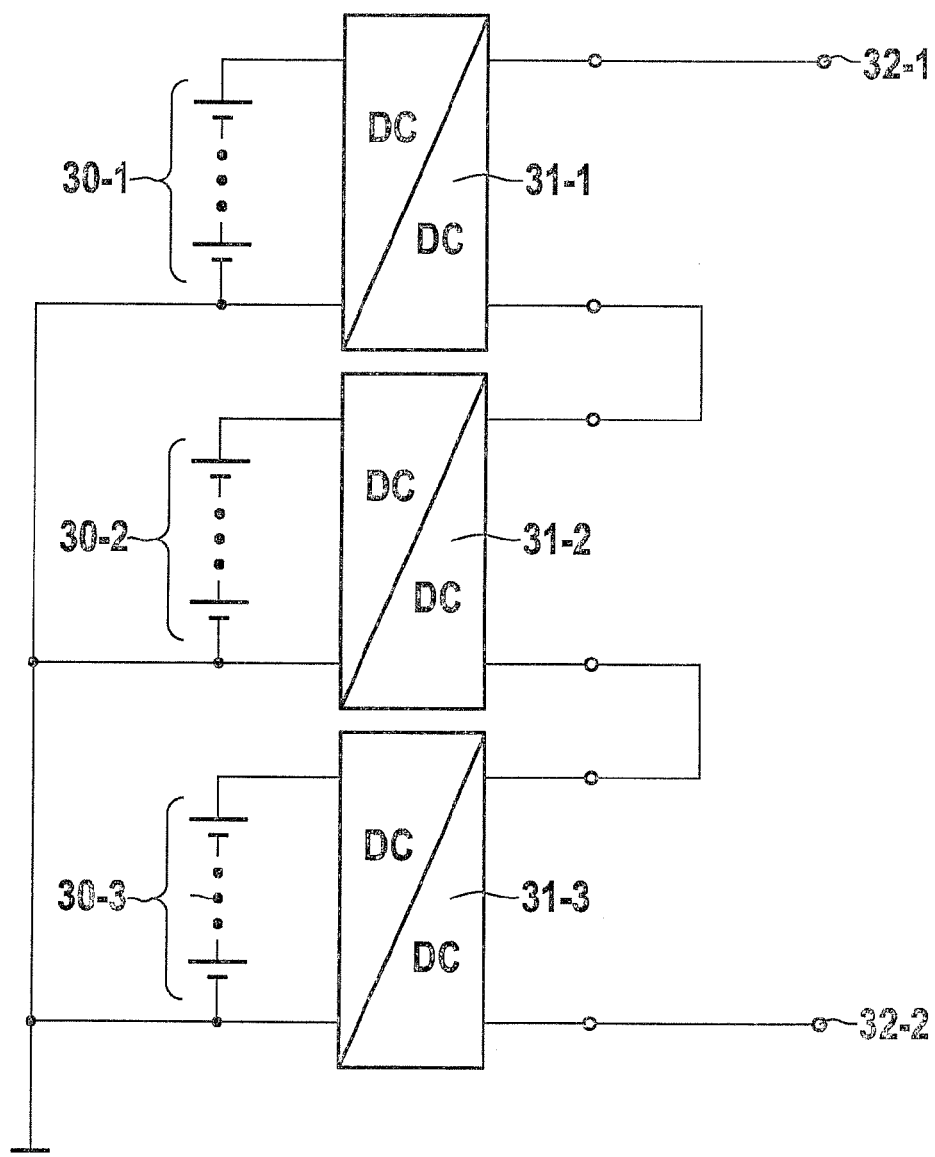
FIG. 3 shows a second exemplary embodiment of the invention.

FIG. 3 shows a second exemplary embodiment of the invention, which is essentially equivalent to the first exemplary embodiment. Once again, a plurality of DC/DC converters 31-1, 31-2, 31-3, whose inputs are connected to battery modules 30-1, 30-2, 30-3, are connected on the output side in series, in order to make a high total voltage available at the outputs 32-1 and 32-2 of the arrangement. As a distinction from the first exemplary embodiment, the first inputs of the DC/DC converters 31-1, 31-2, 31-3 are connected to one another and to ground.

Figure 4:
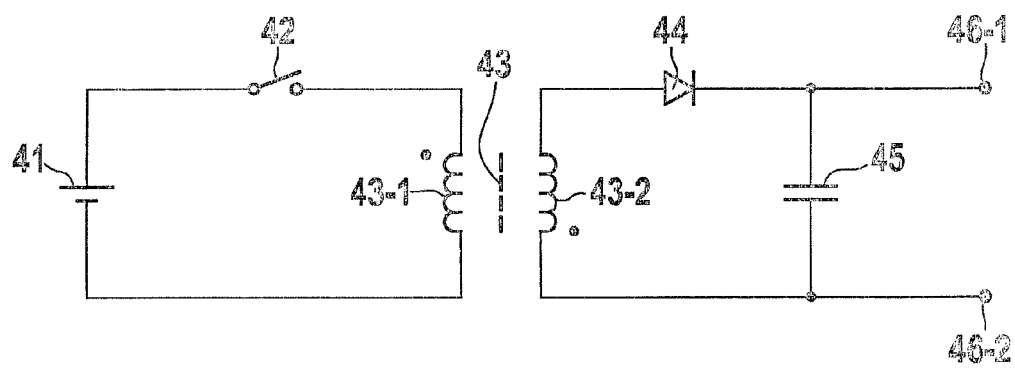
FIG. 4 shows a circuit diagram of a DC/DC converter with a storage transformer.

FIG. 4 shows a circuit diagram of a known DC/DC converter with a storage transformer 43. A direct voltage source 41, which in the case of the invention is equivalent to a battery module, is, via a switch 42, periodically connected to a primary coil 43-1 of a storage transformer 43 and decoupled again from it. When the direct voltage source 41 is connected to the primary coil 43-1, a current flows through the primary coil 43-1, which current leads to the buildup of a magnetic field in the storage transformer 43. When the switch 42 is opened again, the magnetic field outputs the energy stored in it via the secondary coil 43-2 of the storage transformer 43. The output current generated in this way charges a buffer capacitor 45 via the diode 44, and the buffer capacitor buffer-stores and smoothes the output current that flows suddenly as a result of the cycling of the switch 42. At the first and second outputs 46-1 and 46-2, an output voltage occurs which is dependent not only on the capacity of the buffer capacitor 45 but also on the cycling of the switch 42. The DC/DC converter can have a freewheel diode connected in the blocking direction between the first output 46-1 and the second output 46-2; the freewheel diode is not shown in the drawing. In the series connection according to the invention of DC/DC converters, this freewheel diode enables further operation of the energy transmitter in the event of failure of one DC/DC converter, because it automatically short-circuits the outputs of the failed DC/DC converter and thus continues to permit the flow of current in the energy transmitter.

Known DC/DC converters have a controller, which adapts the cycling of the switch 42 to the operating situation. It is also usual for a feedback to be provided, in which the output current applied to the outputs 46-1, 46-2 is determined and used to adapt the cycling of the switch 42, so that the result is an output voltage that is as stable as possible. Within the scope of the invention, these properties of DC/DC converters permit the adjustment of a desired total voltage, depending on the operating situation, of the arrangement of the invention as well as the shutoff of one or all of the DC/DC converters.

An important advantage of the embodiment of a DC/DC converter shown in FIG. 4 is the galvanic decoupling of the input voltage of the direct voltage source 41 from the output voltage at the outputs 46-1, 46-2, which makes the series connection according to the invention of the outputs of the DC/DC converters possible. Still other known DC/DC converters which offer this advantage are suitable for the realization of the invention.

The foregoing relates to the preferred exemplary embodiments of the invention, it being understood that other variants and embodiments thereof are possible within the spirit and scope of the invention, the latter being defined by the appended claims.

The invention claimed is:

1. An energy transmitter for a battery system, the energy transmitter including a plurality of DC/DC converters, each having one first input and one second input and one first output and one second output, wherein the first input and the second input are embodied for connection of a battery module, each of the DC/DC converters having a first control input for a first control signal to produce an electrical connection the first output of the DC/DC converter to the second output of the DC/DC converter upon reception of the first control signal, and wherein the DC/DC converters are connected in series on an output side.

2. The energy transmitter of claim 1, wherein the DC/DC converters each have a first coil.

3. The energy transmitter of claim 2, wherein the DC/DC converters have a second coil, which is coupled with the first coil of the DC/DC converter to form a power transmitter or storage transformer.

4. The energy transmitter of claim 2, wherein the DC/DC converters are embodied as flyback converters, forward converters, push-pull converters, half-bridge converters, and full-bridge converters, or as resonance converters.

5. The energy transmitter of claim 4, wherein each first input of the DC/DC converters is connected to a ground.

6. The energy transmitter of claim 2, wherein each first input of the DC/DC converters is connected to a ground.

7. The energy transmitter of claim 3, wherein the DC/DC converters are embodied as flyback converters, forward converters, push-pull converters, half-bridge converters, and full-bridge converters, or as resonance converters.

8. The energy transmitter of claim 3, wherein each first input of the DC/DC converters is connected to a ground.

9. The energy transmitter of claim 7, wherein each first input of the DC/DC converters is connected to a ground.

10. The energy transmitter of claim 9, wherein each of the DC/DC converters has a freewheel diode, and which anode of each freewheel diode is connected to the second input of the DC/DC converter, and which cathode of each freewheel diode is connected to the first output of the DC/DC converter.

11. The energy transmitter of claim 10, wherein each of the DC/DC converters has a second control input for a second control signal and is embodied for increasing a voltage between the first output and the second output of the DC/DC converter upon reception of the second control signal.

12. The energy transmitter of claim 1, wherein each first input of the DC/DC converters is connected to a ground.

13. The energy transmitter of claim 1, wherein each of the DC/DC converters has a freewheel diode, and which anode of each freewheel diode is connected to the second input of the DC/DC converter, and which cathode of each freewheel diode is connected to the first output of the DC/DC converter.

14. The energy transmitter of claim 13, wherein each of the DC/DC converters has a second control input for a second control signal and is embodied for increasing a voltage between the first output and the second output of the DC/DC converter upon reception of the second control signal.

15. A battery system having an energy transmitter as defined by claim 1 and having a plurality of battery modules, which each have at least one battery cell and whose battery poles are disconnectably attached to a corresponding input of the first input and the second input of a DC/DC converter of the energy transmitter.

16. The battery system of claim 15, wherein the energy transmitter is operatively connected to the plurality of battery modules and an electric motor to provide electric power to operate the electric motor.

* * * * *